(12) United States Patent
Tvetene (10) Patent No.: US 10,299,443 B1
(45) Date of Patent: May 28, 2019

(54) SOD HARVESTERS

(71) Applicant: Gregg Tvetene, Billings, MT (US)

(72) Inventor: Gregg Tvetene, Billings, MT (US)

(73) Assignee: TREBRO HOLDING, INC., Billings, MT (US)

( * ) Notice: Subject to any disclaimer, the term of this patent is extended or adjusted under 35 U.S.C. 154(b) by 512 days.

(21) Appl. No.: 14/998,967

(22) Filed: Mar. 10, 2016

(51) Int. Cl.
*A01G 20/12* (2018.01)
*B65G 37/00* (2006.01)

(52) U.S. Cl.
CPC ............. *A01G 20/12* (2018.02); *B65G 37/00* (2013.01)

(58) Field of Classification Search
CPC .................................. A01G 20/15; A01G 20/12
USPC ..................................................... 172/19, 20
See application file for complete search history.

(56) References Cited

U.S. PATENT DOCUMENTS

| | | | |
|---|---|---|---|
| 3,235,011 A * | 2/1966 | Pasinski et al. ........ | A01G 20/12 172/19 |
| 3,664,432 A * | 5/1972 | Nunes, Jr. .............. | A01G 20/15 172/19 |
| 3,807,505 A * | 4/1974 | Nunes ..................... | A01G 20/15 172/20 |
| 5,775,436 A * | 7/1998 | Noyes, II et al. ...... | A01G 20/15 172/20 |
| 5,857,527 A * | 1/1999 | van Vuuren ........... | A01G 20/15 172/19 |
| 6,296,063 B1 | 10/2001 | Tvetene et al. ................. | 172/19 |
| 6,364,027 B1 | 4/2002 | Tvetene et al. .................... | 172/1 |
| 6,681,864 B2 | 1/2004 | Tvetene et al. ................... | 172/20 |
| 6,783,318 B2 | 8/2004 | Tvetene et al. ............. | 414/789.7 |
| 7,000,706 B1 * | 2/2006 | Dover ..................... | A01G 20/12 172/19 |
| 7,641,437 B1 | 1/2010 | Tvetene et al. ............. | 414/794.3 |
| 7,740,083 B2 | 6/2010 | Tvetene et al. ................ | 172/20 |
| 8,118,154 B2 | 2/2012 | Tvetene et al. ............ | 198/468.8 |
| 8,888,154 B2 | 11/2014 | Tvetene ......................... | 294/61 |
| 2017/0181369 A1 * | 6/2017 | Sammut ................ | A01B 76/00 |

* cited by examiner

*Primary Examiner* — Thomas B Will
*Assistant Examiner* — Joel F. Mitchell
(74) *Attorney, Agent, or Firm* — Johnson & Phung llc (57) ABSTRACT

A sod harvester for cutting a sod slab from a sod field and directing an unspoiled sod slab into a first carrier and a spoiled sod slab into a scrap sod carrier through pivoting an articulated conveyor from an inline condition to an offline condition or vice versa.

20 Claims, 11 Drawing Sheets

SOD HARVESTERS

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of on-the-go sod harvesters that can in a continuous operation cut a sod slab from a sod field and stack the cut sod slabs on a pallet, which can then be transferred to a work site by another vehicle, are known in the art. Typically, the sod harvester includes a set of knives that cut a flat sod slab from the sod field. The sod slab, which may be formed into a sod roll or in some cases left in slab form, is typically elevated upward from the sod field on a conveyor that discharges the sod roll onto a sod transfer mechanism. The sod roll is subsequently transferred to a sod pallet for further handling. The sod pallet with a stack of sod rolls thereon can then be transferred to a work site where the sod rolls are removed from the pallet and applied to the field. Examples of sod harvester for on-the-go harvesting are shown in Tvetene et al. U.S. Pat. Nos. 6,296,063; 6,783,318 and 6,364,027.

Occasionally, during the sod harvesting process a sod slab may be considered spoiled since the sod slab is unsuitable for use in sodding operations. When an operator encounters such a spoiled sod slab the operator may simply discard the spoiled sod slab by allowing the spoiled sod slab to fall to the sod field beneath the sod harvester. In some cases the sod slab may break up when it falls to the ground and in other cases the sod slab may remain intact. In either case the spoiled sod slab should be removed from the sod field at a later time.

If a sod slab breaks up when falling to the ground it becomes more time consuming to remove the spoiled sod slab from the sod field since the sod slab may scatter over a wide area. In addition a spoiled sod slab may also be run over by a wheel on the sod harvester, which causes further deterioration of the sod slab. Unfortunately, from time to time the presence of a spoiled flat sod slab or a spoiled sod roll, which has been run over by the sod harvester in an earlier pass, may also hinder the operation of the sod harvester during a subsequent pass. Eventually, the spoiled sod slabs should be removed from the sod field before the sod field can be replanted for the next sod crop.

The method of simply dropping a spoiled sod slab on the sod field beneath the sod harvester during the sod harvesting process has the advantage of producing a faster sod harvesting operation since spoiled sod slabs can be ejected on-the-go and without interrupting the sod harvesting operation. However, the in situ dropping of a spoiled sod slab may have the disadvantage of making it more difficulty and time consuming to subsequently remove the spoiled sod slab from the sod field since the spoiled sod slab in the form of either a flat sod slab or a sod roll may not remain intact when it falls to the sod field thus requiring greater effort to remove the spoiled sod slab or pieces of the sod slab from the sod field.

One of the prior art methods of dropping a spoiled sod slab from the sod harvesting process uses a laterally retractable bed that is displaced laterally so that a spoiled sod slab falls off the end of a conveyor and onto the ground rather than onto the laterally retractable bed which continues the loading of the unspoiled sod slabs unto a pallet or the like. Unfortunately, the use of a retractable bed usually requires a displacement of other harvester components or interrupting operation of the sod handling within the sod harvester thus increasing the complexity, size and the cost of the sod harvester.

SUMMARY OF THE INVENTION

A sod harvester for cutting a sod slab from a sod field with the sod harvester having a sod elevating conveyor for elevating a sod slab from the sod field onto an angularly positionable articulated sod slab conveyor having a fixed end and a free end for on-the-go uninterrupted delivery of an unspoiled sod slab to a sod stacker when the free end of the articulate sod slab conveyor is an inline condition and for dumping a spoiled sod slab when the free end of the angularly positionable articulated sod slab conveyor is an offline condition without interrupting the delivery of unspoiled sod slabs to the sod harvester.

DESCRIPTION OF THE PREFERRED EMBODIMENT

Figure 1:
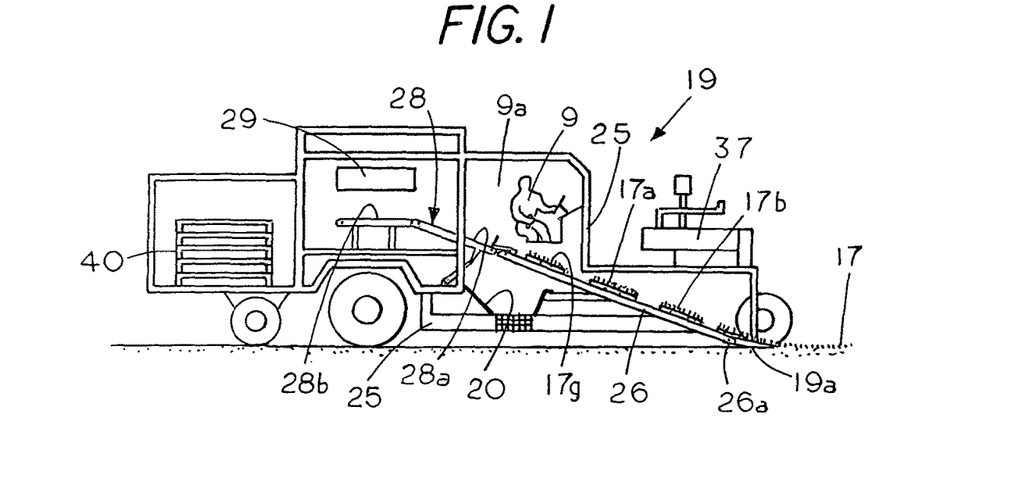
FIG. 1 is a right side view of a sod harvester in a sod transfer position with a scrap sod carrier located beneath a sod conveyor.

FIG. 1 is a right side view of a wheeled, self-propelled sod harvester 19 having a motor 37 that propels the sod harvester as well as sod handling mechanisms within the sod harvester. Examples of sod harvesters our shown in Tvetene et al U.S. Pat. Nos. 6,296,063; 6,783,318 and 6,364,027, which are herby incorporated by reference.

The sod harvester 19 includes an operator station 9a with an operator 9 located therein and a motor 37 for propelling the sod harvester 19, which is supported by chassis 25. The right front side of the sod harvester chassis 25 includes a sod elevating conveyer 26 with a sod cutting mechanism 26a including a knife 19a at the lower end 26a for separating sod slabs 17b, 17a, 17g from the sod field 17. In operation the sod elevating conveyor 26 elevates the cut slabs of sod 17a, 17b and 17g to a position where unspoiled sod slabs can be delivered to an articulated sod conveyer 28 and spoiled sod slabs can be delivered to a scrap sod carrier 20, which extends from side to side of the sod harvester scrap sod carrier 20 captures spoiled sod slabs before the spoiled sod slabs can fall to the sod field 17. The spoiled sod slabs in the scrap sod carrier 20 may be dumped on the sod field at a side of the harvester 19 so they do not interfere with the operation of the sod harvester or the spoiled sod slabs may be allowed to accumulate on the scrap sod carrier and dumped at a later time. The unspoiled sod slabs on the articulated conveyor 28 can be transferred to pallet 40 carried by the sod harvester by a sod pick up mechanism 29. The pallet with the sod slabs thereon can subsequently be transferred to a work site.

Figure 2:
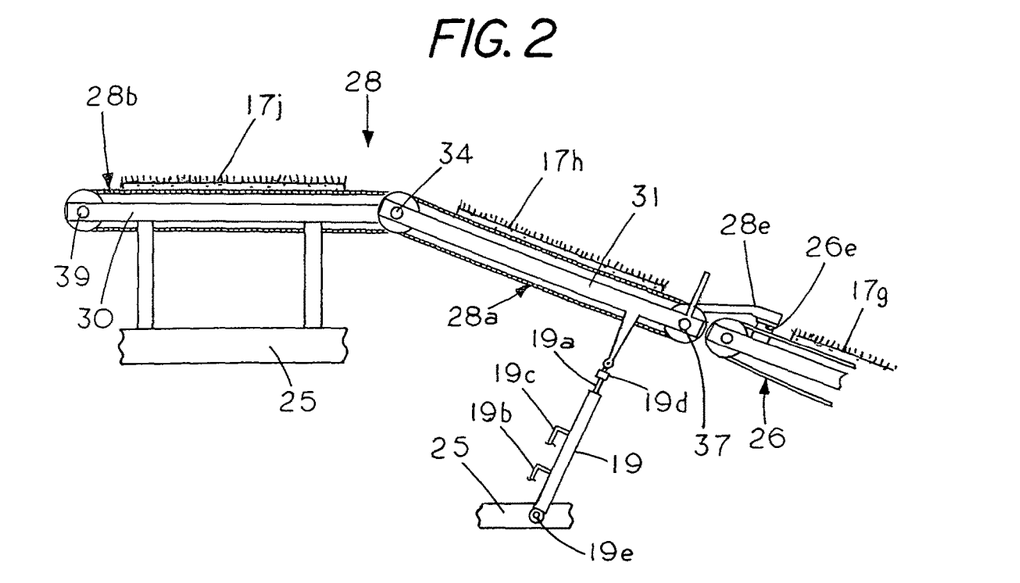
FIG. 2 is an isolated view of an articulated conveyor in a transfer or inline position.

FIG. 2 shows an isolated side view of the articulated sod conveyor 28 of FIG. 1 with frame 30 of articulated conveyor fixed end 28b and frame 31 of articulated conveyor free end 28a supported by harvester chassis 25. FIG. 1 shows articulated sod conveyor 28 in an inline condition with the sod-elevating conveyor 26. In this condition the sod-elevating conveyor 26 and the articulated sod conveyor 28 can continually and on-the-go transfer a sod slab from sod field 17 to the fixed end 28b of the articulated sod slab conveyor 28 where the sod pickup up mechanism 29 (FIG. 1) picks up and transfers the sod slab to one of the pallets carried by the sod harvester.

In the inline condition an arm 28e, which attaches to frame 31 engages a stop 26e on side elevating conveyor 26 to maintain the free end 28a of the articulated sod conveyor 28 in sod transfer alignment with the sod elevating conveyor 26 so that a sod slab can be smoothly transferred from conveyor to conveyor without spoiling the sod slab and without having to interrupt the transfer motion of either the sod elevating conveyor 26 or the articulated sod conveyor 28. Attached to chassis 25 and to frame 31 of the articulated sod conveyor 28 is a two-way hydraulic cylinder 19 having a pair of ports 19b and 19c for extending or retracting ram 19a through hydraulic pressure. One end of hydraulic cylinder 19a pivotal attaches to chassis 25 through a pivot pin 19e and the extendable ram 19a attaches to frame 31 through a pivot pin 19d. Similarly, an identical two-way cylinder (not shown) attaches to the opposite side of frame 31 with the two-way cylinders allowing an operator to pivot the free end 28a from an inline condition shown in FIG. 1 and FIG. 2 to an offline condition shown in FIG. 3 and FIG. 4. The pivoting of the free end 28b of the articulated conveyor 28 between an inline condition and an offline condition may be manually controlled by an operator or a timer in the hydraulic system may be used to maintain a hydraulic signal to hydraulic cylinder 19 for sufficient time to bring the free end 28b to the open position and long enough for the sod elevating conveyor 26 to dump the spoiled sod. The hydraulic signal can then be used to bring the free end 28a back into the inline condition so that the unspoiled sod slabs on conveyor 26 can continue to be processed for stacking on pallets. A feature of the invention is that the bringing the free end 28a into an offline condition does not effect the transfer of unspoiled sod slabs into the sod harvester since the opening and closing of the free end 28a of the articulated sod carrier can be completed before another unspoiled sod slab on the sod elevating conveyor 26 is ready to be transferred to the free end 28a of the articulated sod conveyor. Thus the dumping of the spoiled sod slabs can be done on-the-go and without interrupting the transfer of unspoiled sod slabs between the inclined or sod elevating conveyor 26 and conveyor free end 28a of the articulated sod conveyor 28.

Figure 3:
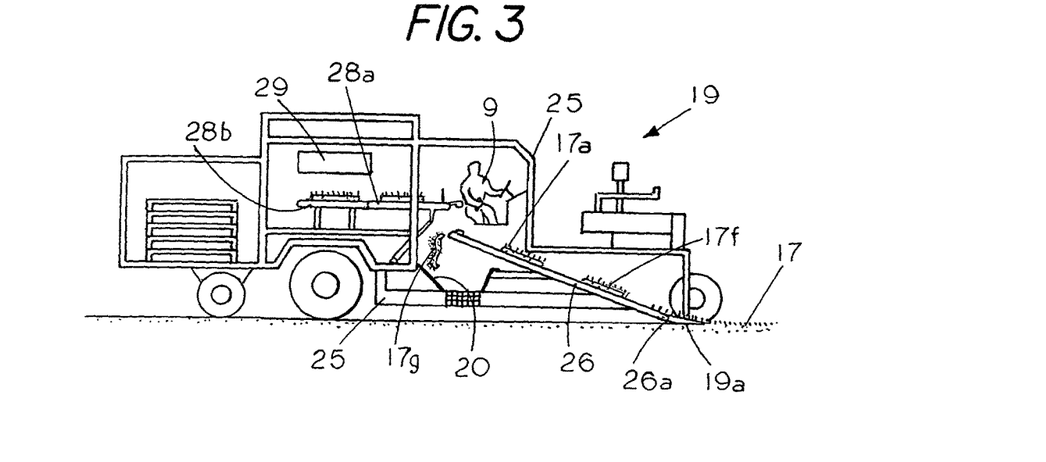
FIG. 3 is a right side view of the sod harvest of FIG. 1 in the open or offline position with a spoiled sod slab being dumped onto a sod carrier.

FIG. 3 shows a side view of sod harvester 19 in the offline condition with the sod-elevating conveyor 26 dumping a spoiled sod slab 17g into the scrap sod carrier 20. While the sod slab 17g is being dumped into the sod slab carrier 20 the articulated sod conveyer 28 and the elevating sod carrier 26 remain live so that the unspoiled sod slabs thereon can continue to be transferred to the fixed end 28b of the articulated conveyor 28 where the sod transfer mechanism 29 can pick up and transfer the sod to a pallet for transfer to a work site. Thus a feature of the invention is the disposing of a spoiled sod slab while simultaneously powering both the sod conveyor 26 and the articulated sod conveyor 28 as the free end 28a of the articulated sod conveyor cycles between either an inline condition or an offline condition.

Figure 4:
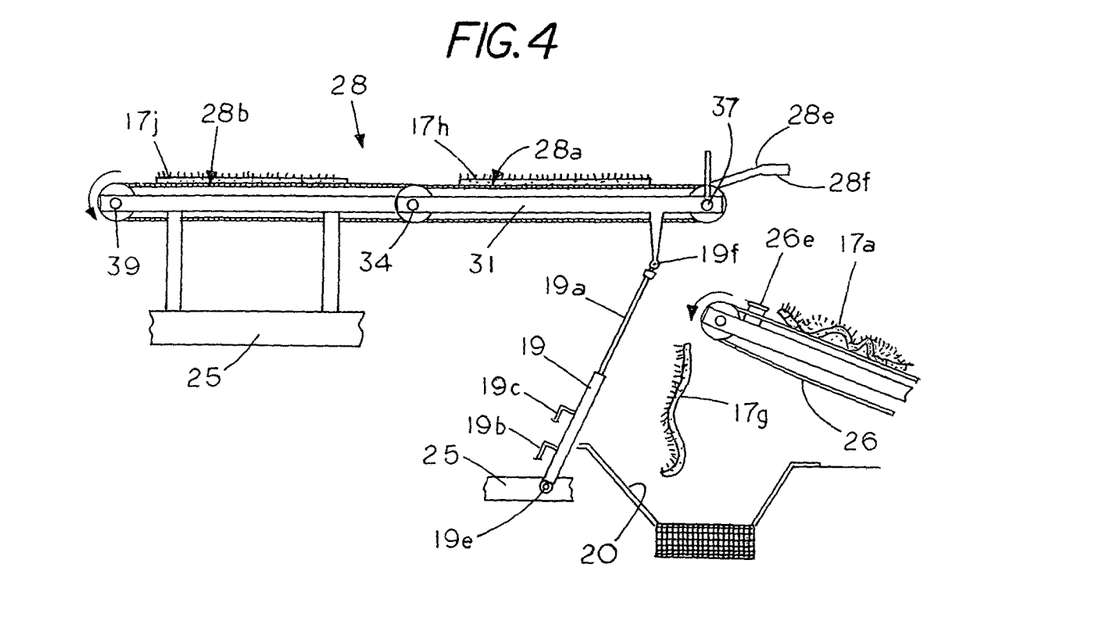
FIG. 4 is an isolated side view of the articulated conveyor in the open or offline position.

FIG. 4 is a side view of the articulated conveyor 28 in an off line position. In the offline position sod slabs 17j and 17h on the articulated conveyor 28 or the sod elevating conveyor can continue to be processed without interruption since the articulated conveyor 28 remains powered during the angular positioning of the articulated conveyor 28 from the inline condition shown in FIG. 2 to the offline condition shown in FIG. 4. Note, in the offline position the ram 19a is extended pivoting the free end 28a of the conveyor 28 upward so a spoiled sod slab 17 g can be dumped in the scrap sod carrier 20. In the offline position the arm 28e disengages with stop 26e.

In operation of the harvester 10 the articulated conveyor free end 28a cycles between the inline position shown in FIG. 2 to the offline position shown in FIG. 4. FIG. 4 shows a spoiled sod slab 17g falling from the elevating sod conveyor 26 when the conveyor free end is in the off line condition. A feature of the invention is that in the cycling operation of the conveyor free end 28a the conveying of an unspoiled sod slab toward the pick up mechanism 29 continues without interruption. That is, conveyor 28 remains in the live or powered condition as the conveyor free end 28a pivots from the inline condition to the offline condition. The cycle includes three time periods, a first time period $t_1$ where the free end 28a pivots from the inline position shown in FIG. 2 to the offline position shown in FIG. 4, a second time period $t_2$ where the free end 28a remains in the offline position shown in FIG. 4 and a third time period $t_3$ where the free end 28a returns from the offline condition to the inline shown in FIG. 2. In operation the time $t_1$ needs to be sufficiently short so that the free end 28a can be pivoted upward out of the way of a spoiled slab to be dumped from the sod elevating conveyor 26 but sufficiently long so that the pivoting action does not throw an unspoiled sod slab, which may be on the free end 28a of the articulated conveyor 28. The time $t_2$ is determined by the speed of the conveyor 26 since the conveyor free end 28a must remain in the offline condition for sufficiently long for the spoiled sod slab to clear the end of the conveyor 26. The limits for time $t_3$ is also determined by the speed of the conveyor 26 since the free end 28a of the conveyor needs to be returned to the inline conditions in time for the unspoiled sod slabs on conveyor 26 to be transferred to the free end 28a of articulated conveyor 28. As it can be seen in the above example the dumping of a spoiled sod slab is a seamless operation in that it does not interfere with the normal sod harvesting operation of the unspoiled sod slabs.

Figure 5:
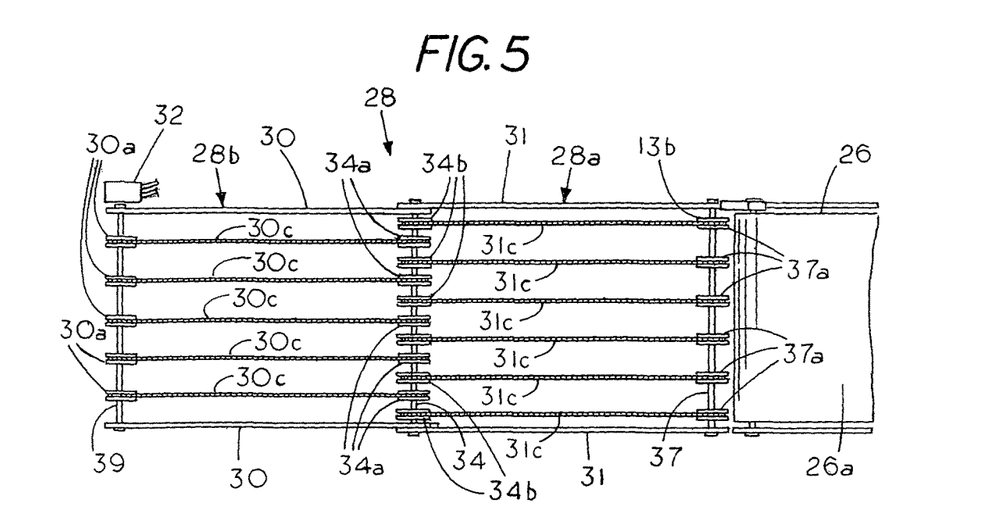
FIG. 5 is an isolated top view of the articulated conveyor proximate the sod conveyor.
Figure 6:
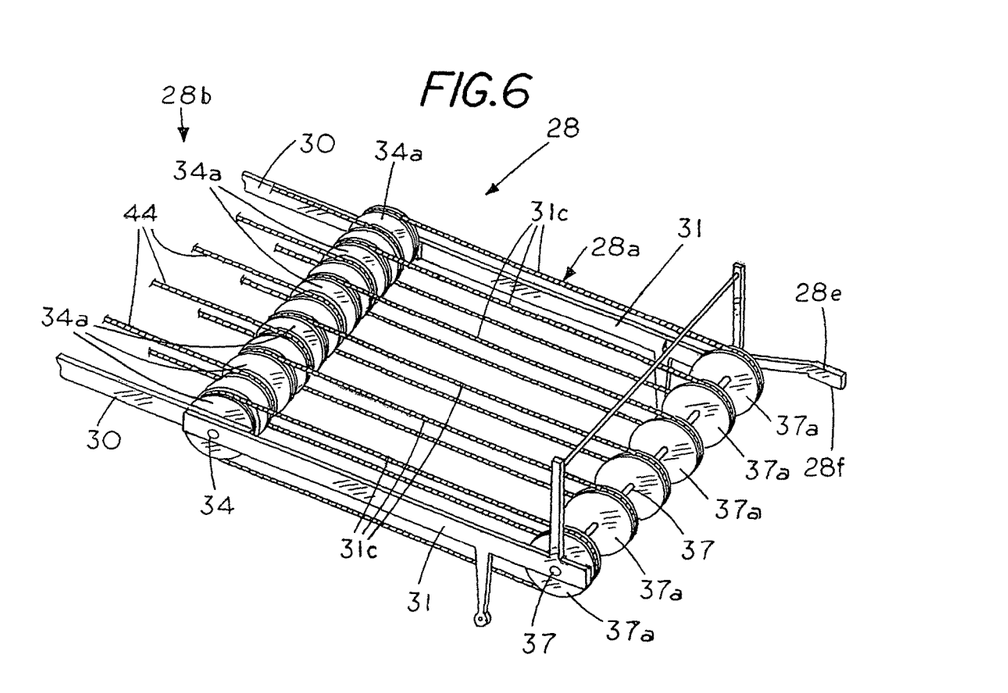
FIG. 6 is an isolated perspective view of the free end of the articulated conveyor.

FIG. 5 is a top view of the articulated conveyor 28 and the sod-elevating conveyor 26 and FIG. 6 is a partial perspective view of the articulated conveyor 28. In this example the sod-elevating conveyer 26 includes a belt 26a for elevating the sod slabs to the free end 28a of the articulated conveyor 28, which includes two sets of parallel chain belts 30c and 31c. In this example the fixed end 28b of articulated conveyor 28 includes a first set of parallel endless belts or roller chains 30c for supporting and transferring a sod slab. Each endless chain 30c is mechanically engaged with a set of integral teeth in sprocket wheel 30a on shaft 39, which is journaled in one side of frame 30, and a set of integral teeth in sprocket wheel 34a on shaft 34, which is journaled on the other side of frame 30. Sprocket wheels 30a are affixed to shaft 39 so that rotation of shaft 39 through hydraulic motor 32 rotates shaft 39 and consequently rotates sprocket wheels 30a, which drives the endless belts 30c. Driving endless belts 30c also rotates a set of parallel sprocket wheels 34a and 34b, which are affixed to shaft 34. The rotation of sprocket wheels 34b drives endless chains 31c, which are supported by a further set of sprocket wheels 37a that are affixed to shaft 37, which is journaled in the opposite sides of frame 31 of the free end 28a of the articulated conveyor 28.

In this example the articulated conveyor fixed end 28b and the articulated conveyor free end 28a are pivotal about shaft 34, which is journaled in both the sides of frame 30 and frame 31 so that the free end 28a of the articulated conveyer 28 can pivot with respect to the fixed end 28b of the articulated conveyor as illustrated in FIG. 2. A feature of common sprocket shaft 34 on the fixed end of the articulated conveyor and the free end of the articulated conveyor is that one maintain a same sod transfer rate on the fixed end of the articulated conveyor and the free end of the articulated conveyor as the free end of the articulated conveyor is moved from the offline condition to the inline condition or vice versa.

In one example the articulated conveyor 28 has a sod slab transfer speed synchronized with a sod slab transfer speed of the sod slab conveyor 26 to transfer an unspoiled sod slab from the sod slab conveyor 26 to the articulated conveyor in a continuous motion and with out spoiling a sod slab thereon.

Figure 7:
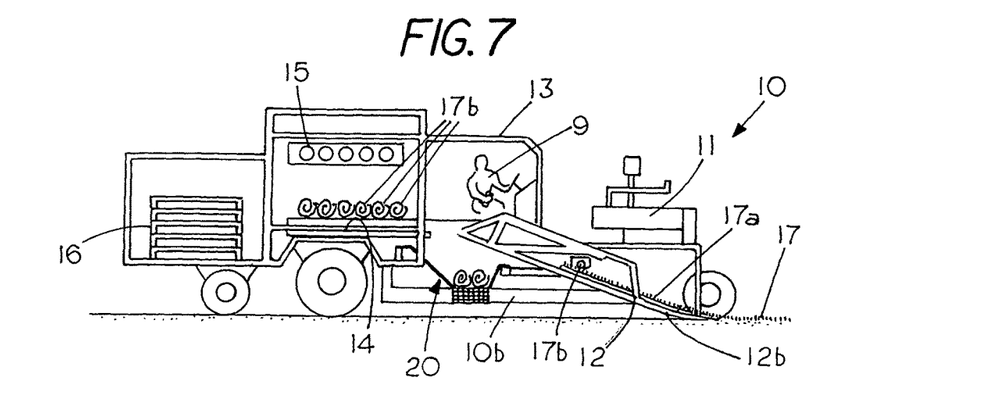
FIG. 7 is a right side view of a sod harvester with a scrap sod carrier located beneath a sod conveyor.

FIG. 7 is a right side view of another example of a wheeled, self-propelled sod harvester 10 having a motor 11 that propels the sod harvester as well as a sod handling mechanism within the sod harvester.

The sod harvester 10 includes an operator station 13 with an operator 9 located therein. The right front side of the sod harvester includes an elevating sod conveyer 12 with a sod cutting mechanism 12b including a knife at the lower end for separating a sod slab 17a from the sod field 17. In a first mode the conveyor 12 elevates the cut slab of sod 17a and forms it into a sod roll 17b, which is delivered to a sod transport mechanism 14 (FIG. 2). A pick up mechanism 15 (FIG. 1) on sod harvester 10 transfers the sod rolls 17b to one of the pallets 16 carried by the sod harvester. The pallet with the sod rolls 17b are subsequently transferred to a work site.

In the second mode, which is shown in FIG. 3, the sod harvester 10 delivers a spoiled sod slab 17c to an internal scrap sod carrier 20 that extends from side to side of the sod harvester 10. The scrap sod carrier 20 captures the spoiled sod slab 17c before the spoiled sod slab can fall to the sod field 17. The spoiled sod slabs in the scrap sod carrier 20 may be dumped on the field at a side of the harvester where they do not interfere with the operation of the sod harvester or the spoiled sod slabs may be allowed to accumulate on the scrap sod carrier and dumped at a later time. As illustrated in the drawings the scrap sod carrier 20 is located between and within the frame 10a and 10b of the sod harvester as the scrap sod carrier extends laterally from side to side of the sod harvester.

In the example shown the scrap sod carrier 20 is used to capture rolled sod slabs 17c. In this example a sod deflector or bang board 21 may be used to break the free fall of the spoiled sod roll 17c and limit damage to the spoiled sod roll as the deflector directs the spoiled sod roll into the scrap sod carrier 20. The scrap sod carrier, which is located below a discharge end of the sod conveyor 12, includes a scrap sod conveyer belt 22 extending transversely to the direction of motion of the sod harvester 10. The activation of the scrap sod conveyor belt 22 transfers the spoiled sod rolls from one side of the harvester to the opposite side of the harvester where the spoiled sod rolls are ejected laterally away from the sod harvester to a location where the spoiled sod rolls will not interfere with the forward motion of the sod harvester or with subsequent passes of the sod harvester. Alternately, the spoiled sod rolls may be accumulated and carried on the scrap sod carrier and subsequently dumped at a selected location thus avoiding spoiled sod rolls scattered about the sod field.

Figure 8:
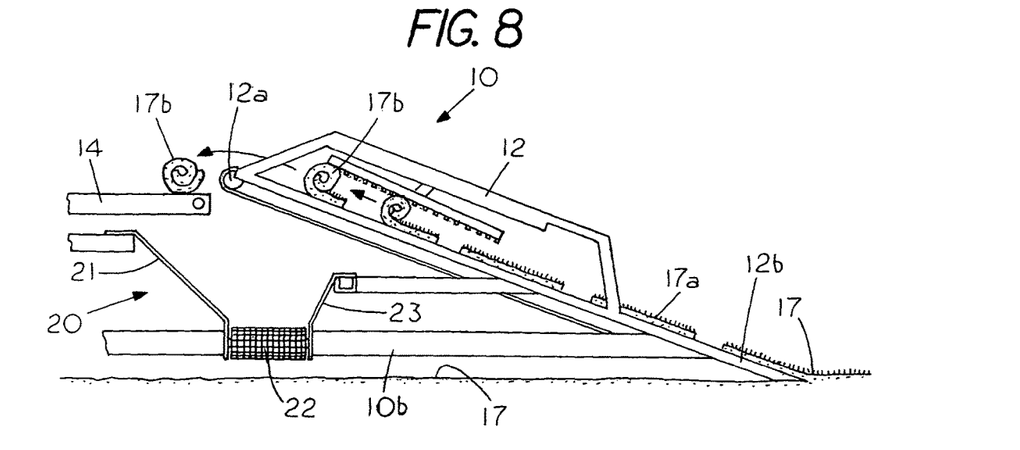
FIG. 8 is an isolated view of the sod harvester conveyor and scrap sod carrier of FIG. 7 with the sod conveyor carrier delivering an unspoiled sod roll to a sod transport mechanism.

FIG. 8 is a partial right side view of the sod harvester 10 showing the operation of the sod harvester in a first conventional mode as the conveyor 12 directs an unspoiled sod roll 17b, which has been formed on conveyor 12, onto a displaceable sod transfer member 14, which may be a further conveyor. The sod transfer mechanism 14 is located proximate an upper discharge end 12a of conveyor 12 so that the impetus to the sod roll 17b discharging from the sod conveyor 12 as well as the gravitational forces acting on sod roll 17b directs the sod roll 17b onto the sod transfer mechanism 14 where the sod roll 17b can be further processed and stacked on pallets for delivery to a work site.

Figure 9:
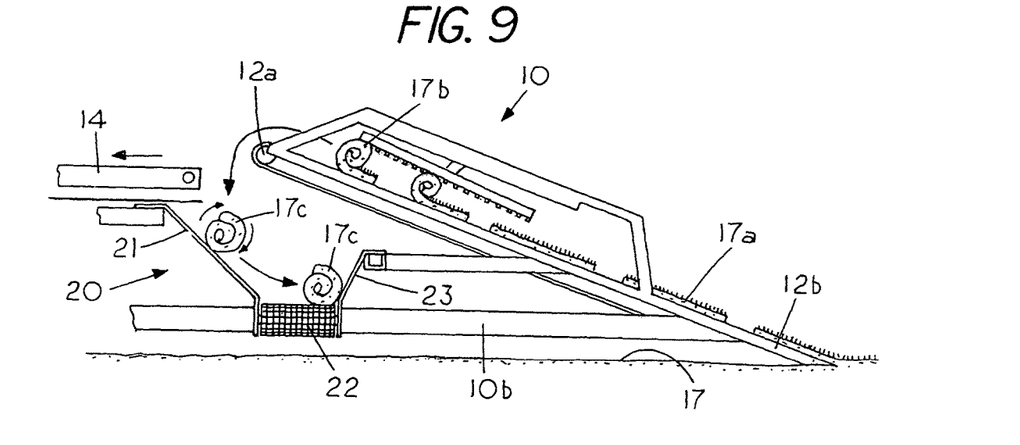
FIG. 9 is an isolated view of the sod harvester conveyor of FIG. 7 with the sod conveyor delivering a spoiled sod roll to a scrap sod carrier.

FIG. 9 is a partial right side view of the sod harvester 10 showing the sod harvester 10 in a second mode. In the second mode operator 9 moves the sod transfer mechanism 14 away from the upper discharge end 12a of the conveyor 12 allowing a spoiled sod roll 17c on conveyor 12 to fall past the end of the sod transfer mechanism 14 and into a scrap sod carrier 20, which is located below the conveyor 12. Normally, scrap sod rolls are allowed to fall to the earth beneath the sod harvester. However, in the invention described herein, the scrap sod carrier 20 captures the spoiled sod slab 17c preventing the spoiled sod roll 17c from falling to the earth and being run over by the sod harvester 10, which causing further deterioration of the sod roll making it more difficult and time consuming to remove the spoiled sod roll from the sod field. In addition, in some cases the spoiled sod roll on the field may interfere with the smooth operation of the sod harvester. A feature of the present invention is that although spoiled sod rolls are of little salvage value the preservation and field capture of spoiled sod rolls before they can fall under the sod harvester not only reduces clean up time of spoiled sod rolls but it also prevents spoiled sod rolls from interfering with the smooth operation of the sod harvester.

FIG. 9 shows that in the second mode the spoiled sod roll 17c falls onto a deflector plate or bang board 21 that extends at an acute angle to the horizon. The bang board funnels or directs the spoiled sod roll 17c downward toward a laterally extending scrap sod conveyor 22. An upward extending side wall 23 prevents the sod roll 17c from rolling out of the scrap sod carrier 20 as it rolls down the bang board 21.

FIG. 9 also illustrates that after hitting the bang board 21 the spoiled sod roll 17c rolls down bang board 21 and onto an open link scrap sod conveyor belt 22 thus maintaining the integrity of the spoiled sod roll 17c since the spoiled sod roll 17 falls only partway to earth as the bang board 21 breaks the free fall of the sod roll, which reduces impact forces that can tear apart the sod roll 17c. Note, that once the spoiled sod roll 17c hits the bang board 21 it starts rolling in a clockwise direction, which prevents unwinding of the sod roll, so that the sod roll 17c remains intact as it rolls into the open link conveyor belt 22 in the bottom of the laterally extending scrap sod carrier 20.

As can be seen in FIG. 9 the bang board 21 not only reduces the impact forces on the sod roll 17c since the sod roll 17c is captured before the sod roll can fall to the earth but it also helps maintain the sod roll 17c in a wound condition as the sod roll 17c is delivered to the scrap sod conveyor belt 22. Although most scrap sod rolls 17c are discarded and therefore the condition of the sod roll 17c may not be important from a stand point of salvage, however, in the invention described herein it has been found that the maintenance of the integrity of the scrap sod rolls 17c until the sod roll can be properly recycled has been found to not only reduce time-consuming field cleanup of the spoiled sod rolls but also prevent spoiled sod rolls on the sod field from hindering the harvesting of unspoiled sod rolls from the sod field.

Figure 10:
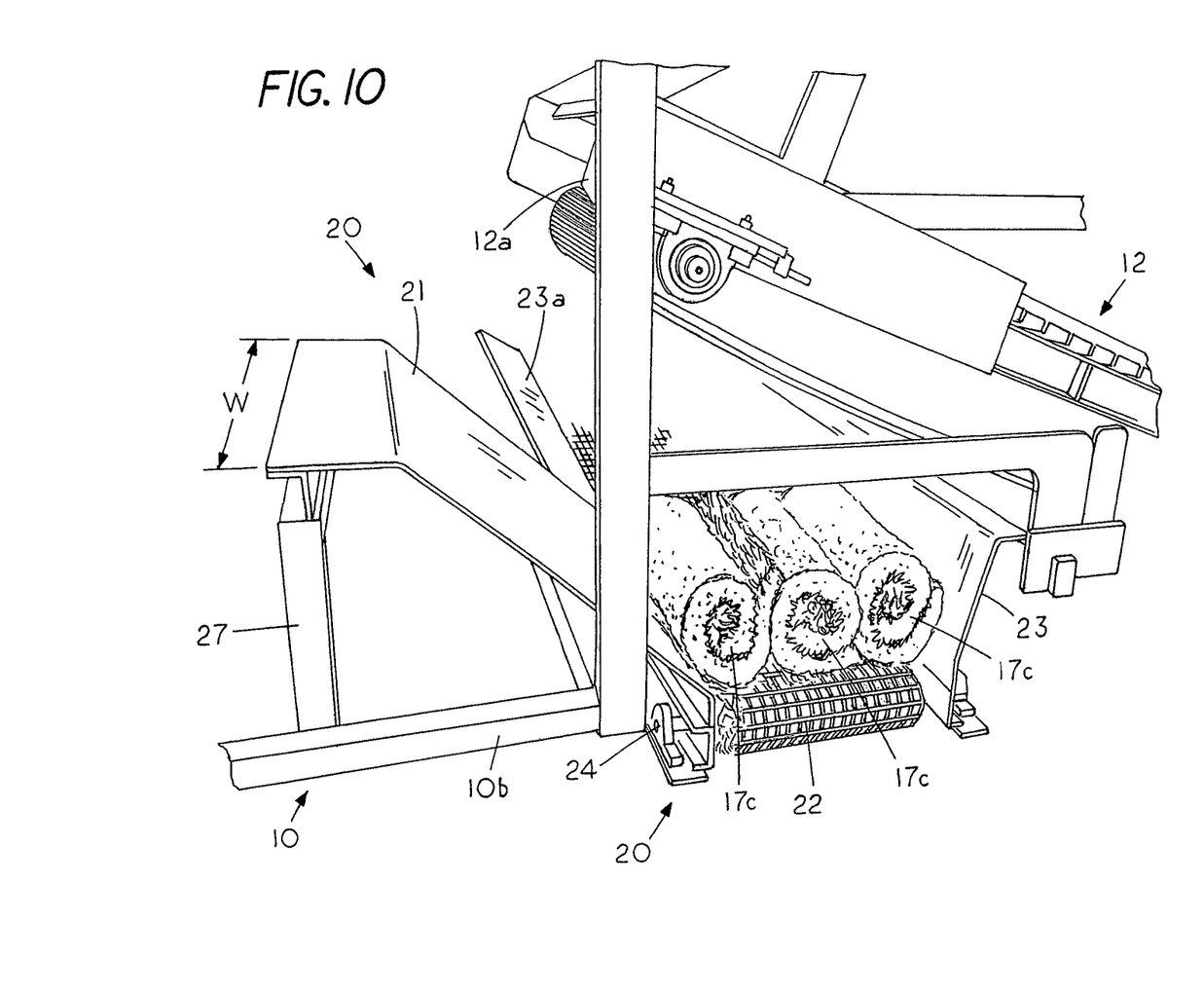
FIG. 10 is an isolated and perspective right side view of the scrap sod carrier with three rolls of spoiled sods thereon.

FIG. 10 shows an isolated perspective view of the sod conveyor 12 and the right end of scrap sod carrier 20 revealing the sod conveyor 12 having a discharge end 12a that is located above bang board 21, which is supported by frame 27 of sod harvester 10. As can be seen in FIG. 4 the bang board 21 and side wall 23a form one side wall of scrap sod carrier 20 and sidewall 23 forms an opposite sidewall to form a sod slab trough therebetween. The trough allows multiple sod rolls 17c to accumulate on the open chain conveyor belt 22, which is rotatably supported on one end by a shaft 24 and on the opposite end by a second shaft (not shown), which extends from side to side of the scrap sod carrier 20.

The bang board 21, which is located on the right side of the sod harvester 10, has a width W that is preferably wider than a sod roll 17c to provide a support surface for a falling sod slab roll 17c as the sod roll falls thereon and begins rolling onto the scrap sod conveyor 22 that extends from the right side 10b of the harvester 10 to the left side 10a of the sod harvester 10.

Figure 11:
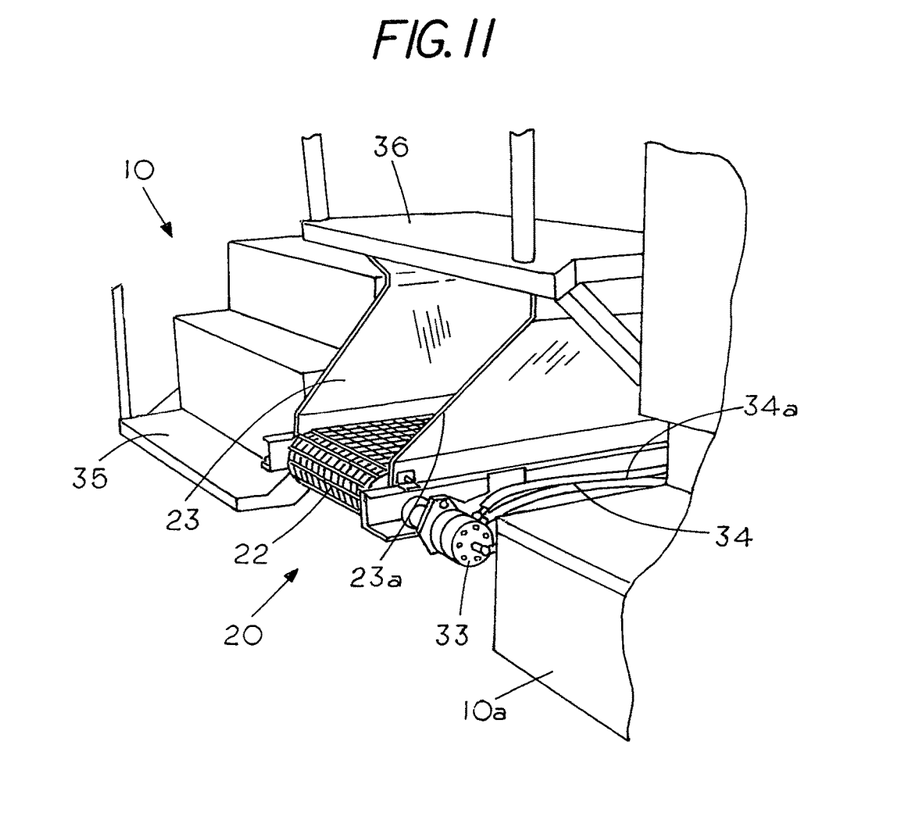
FIG. 11 shows an isolated partial left side view of the a discharge end of the scrap sod carrier.

FIG. 11 is an isolated perspective left side view of the sod harvester 10 revealing the discharge end of the scrap sod carrier 20 with the conveyor sidewall 23a and conveyor sidewall 23 forming a trough to hold spoiled sod slab rolls therebetween. Scrap sod carrier 20, which is supported by sod harvester 10, extends from the right side 10b of the sod harvester 10 to the left side 10a of the harvester, which enables chain conveyor belt 22 to transfer a scrap sod roll 17c from the harvesting side 10b of the sod harvester 10 to the opposite side of the harvester 10a where the scrap sod conveyor belt 22 ejects the sod roll 17c laterally outward away from the sod harvester.

The left side of sod harvester 10 includes a set of steps 35 and a platform 36 for an operator to mount the sod harvester and enter operator station 13 (FIG. 1). The sod harvester controls (not shown) as well as the hydraulic controls for the scrap sod carrier 20 are located in operator station 13. In this example the scrap sod carrier conveyor belt 22 comprises an open link chain belt, which is powered through a hydraulic motor 33 that can be controlled from operate station 13 through a set of hydraulic lines 34 and 34a. Although other types of conveyors may be used a link chain belt conveyor has the advantage of mechanically and frictionally engaging a sod roll as well as allowing any loose soil to fall through the spaces between the links in the ling chain conveyor belt.

A feature of the scrap sod carrier 20 and the hydraulic motor 33 is that the scrap sod carrier 20 may be operated independently of the sod harvesting action of the sod harvester 10. That is, in one mode the scrap sod conveyer belt 22 may run continually to transfer spoiled sod rolls from one side of the harvester to the opposite side of the sod harvester 10 where the spoiled sod roll can be dumped proximate the side 10a of the sod harvester 10. In a second mode the scrap sod carrier conveyor belt 22 can be advanced partially so that any sod slab rolls 17c thereon are moved toward the ejection side 10a of the scrap sod harvester. Once stopped further scrap sod can be accumulated on the scrap sod carrier 20. The advantage of a periodic rotation of scrap sod conveyor belt 22 is the scrap sod carrier 20 can be used to accumulate multiple spoiled sod rolls 17c, which are held in a side-to-side condition and an end-to-end condition on the scrap sod conveyor belt 22. The operator can activate the scrap sod conveyor belt 22 by supping power to hydraulic motor 33 through hydraulic lines 34 and 34a to eject all the scrap sod rolls 17c in the scrap sod carrier 20 at one site thus making it easier for field clean up of the spoiled sod slab rolls since the spoiled sod rolls are not scattered over the field.

Figure 12:
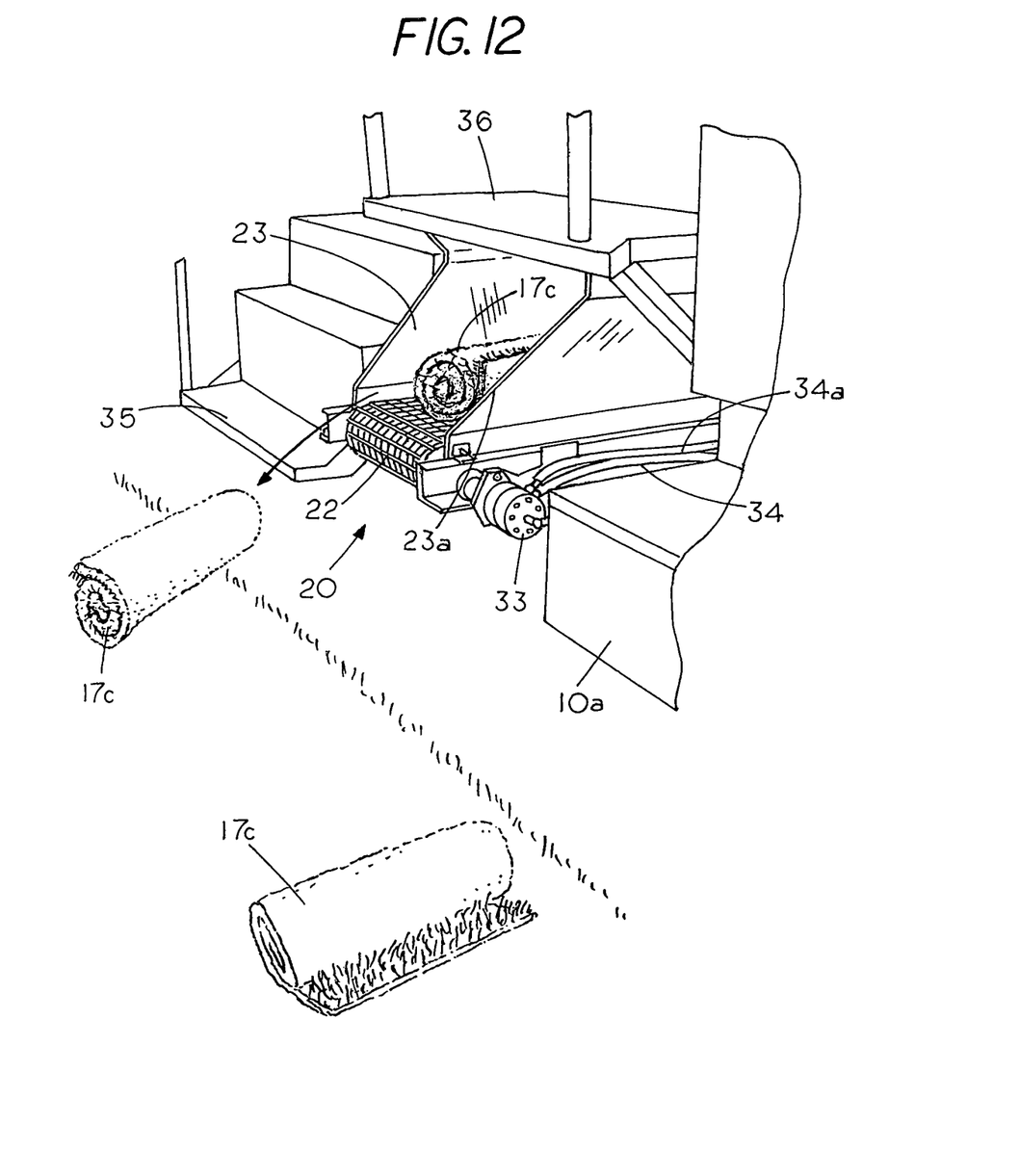
FIG. 12 shows a spoiled sod slab ejected from scrap sod carrier without disintegration of the spoiled sod slab.

FIG. 12 is a left side view showing the discharge of a scrap sod roll 17c from the sod carrier 20 with two spoiled sod rolls 17c already having being discharged from the sod carrier 20 and a third spoiled sod roll 17c about to be discharged to a location proximate the left side 10a of the sod harvester 10.

Figure 13:
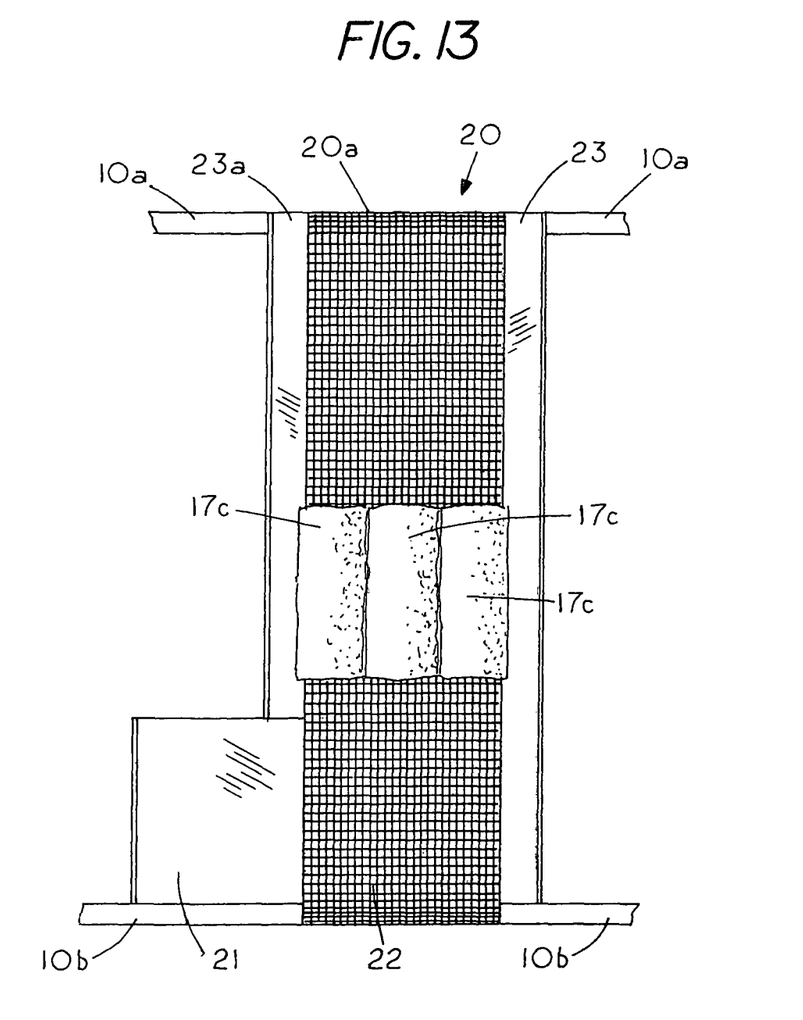
FIG. 13 is an isolated top view of the scrap sod carrier that extends from side to side of the sod harvester.

FIG. 13 is a top isolated view of the scrap sod carrier 20 showing that the scrap sod carrier 20 extends from the right side 10b of the sod harvester, where it receives a spoiled sod roll 17c, to the left side 10a of the sod harvester, where it discharges the spoiled sod roll 17c alongside the sod harvester while the sod harvester is either stationary or harvesting sod. The bang board 21, which is located on the right or harvesting side of sod harvester 10, extends rearward in the sod harvester 10 so as to be in sod fall alignment with the conveyor 12 as illustrated in FIG. 3. Sidewall 23 and 23a, which extend alongside chain link conveyer belt 22, maintain the sod rolls 17c on the chain link conveyor belt 22 as the sod rolls 17c are transported from the right side 10b of the harvester, where the sod is cut, to the opposite side of the harvester 10, where the scrap sod rolls are ejected onto the sod field. In the example shown a chain link conveyor belt 22 supports and delivers the spoiled sod rolls since the chain link conveyor belt 22 has the advantage of allowing loose soil to fall through the conveyor belt 22 while the links in the conveyor belt 22 frictionally and mechanically engage the sod rolls 17c on the conveyor belt 22 to carry the sod rolls 17c from one side of the harvester to the other side. To prevent clogging of the sod slab carrier 20 the sidewalls 23 and 23a comprise smooth, flat, low friction surfaces so that if the sod rolls 17c contact the sidewalls the sod rolls slide along the sidewalls as the conveyor belt 22, which is underneath the sod rolls 18c, pulls the sod rolls 17c to a discharge end 20a of the sod slab carrier 20.

Figure 14:
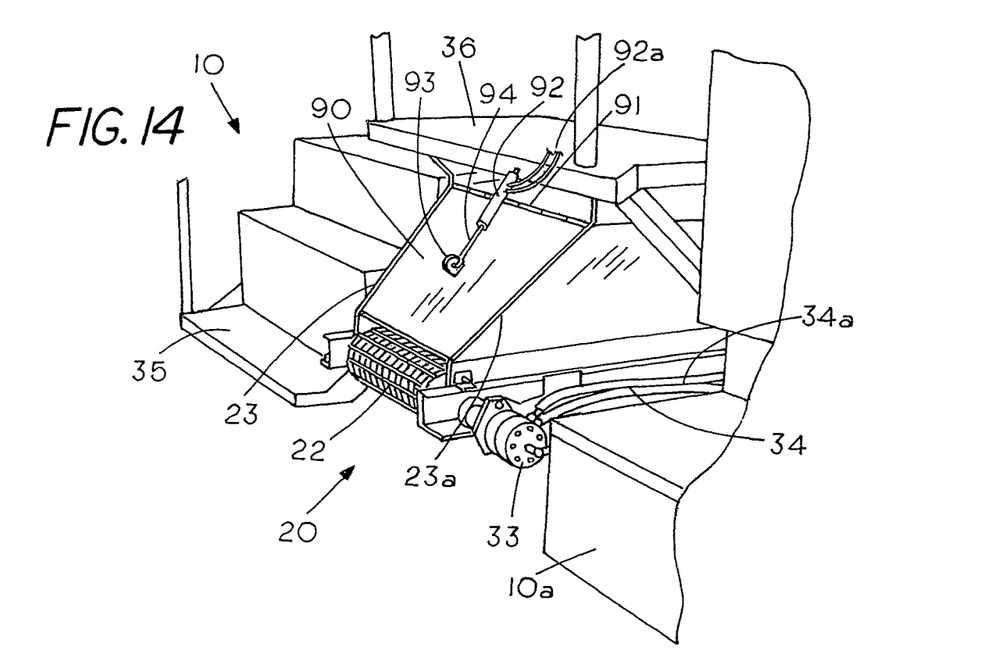
FIG. 14 shows an isolated partial left side view of an example of the a scrap sod carrier with a pivotal sod gate preventing discharge of scrap sod from the scrap sod carrier.

FIG. 14 shows the discharge end of the scrap sod carrier 20 with a sod gate 90 pivotally attached thereto. An elongated hinge 91 connects the top of sod gate to the sod harvester platform 36 with a two way hydraulic cylinder 92 having one end connected to sod harvester platform 36 and the extendable shaft 94 of hydraulic o connected to an extension 93 secured to the top of sod gate 90. A pair of hydraulic hoses 92 allows one to extend or contract shaft 94 to close or open sod gate 90.

As shown in FIG. 14 the sod gate 90, which is in the closed condition, extends across the open end of the sod scrap carrier 20 preventing ejection of scrap sod even though the conveyer belt 22 may still be rotating. In operation as the conveyor belt 22 continues to rotate carries scrap sod toward the discharge end of the sod scrap conveyor until the scrap sod encounter the sod gate 90, which stops movement of the scarp sod. However, by having conveyor belt 22 continue to rotate underneath the scrap sod held by the sod gate 90 the belt can carry additional scrap sod 17c to the discharge end of the sod scrap carrier where it accumulates behind the sod gate. In this mode of operation the conveyor belt 22 should run continually and generate sufficient friction with the scrap sod to carry the scrap sod therein to the discharge end of the scrap sod carrier but at the same time allow the conveyor belt 22 to slide beneath the scrap sod 17c on the conveyor belt when the scrap sod encounters the closed sod gate 90 as shown in FIG. 14. This feature allows one to continue to bring additional scrap sod on the conveyor belt 22 toward the field discharge end of the scrap sod carrier for discharge at a later time.

Figure 15:
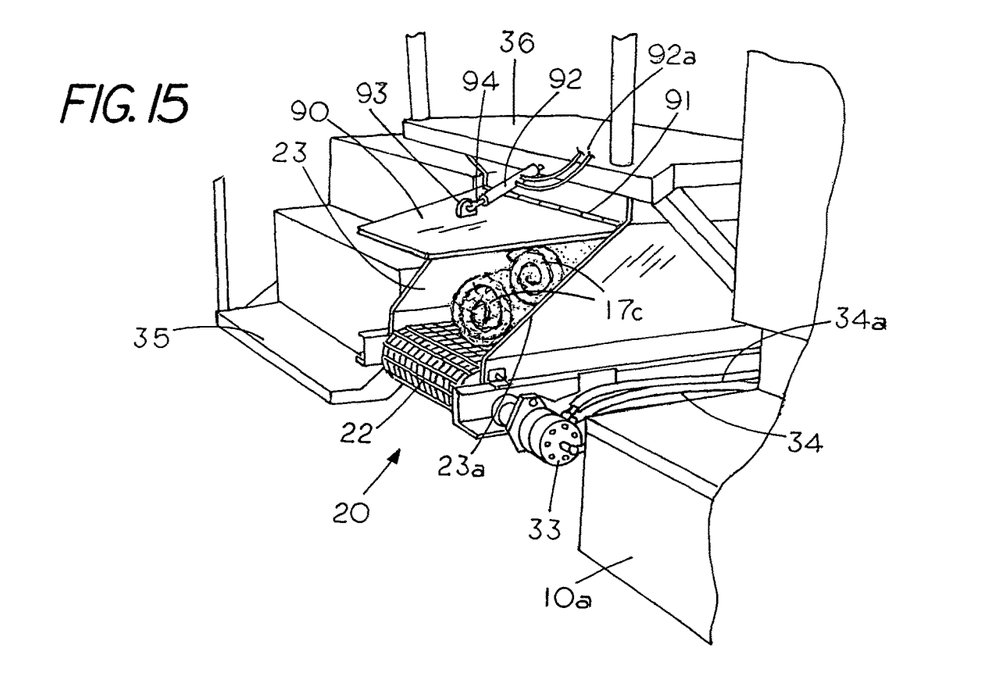
FIG. 15 is an isolated partial left side view of the pivotal sod gate of FIG. 14 in an open condition as the scrap sod carrier dumps scrap sod into a pile next to the sod harvester.

FIG. 15 shows the sod gate 90, which is pivoted upward on elongated hinge 91, in the open condition through a retraction of hydraulic shaft 94 on hydraulic cylinder 92. In the open condition scrap sod 17c and any additional scrap sod 17c located on the conveyor belt 22 can be dumped in a pile lateral of the sod harvester 10 through the continued rotation of the conveyor belt 22. Once the scrap sod 17c on conveyor belt 22 has been dumped the pivotal sod gate 90 can be closed to again allow scrap sod to accumulate on the conveyor belt 22. In this example the shaft 92 on the hydraulic cylinder 92 can be extended or retracted by the operator, however, in some applications a sensor may be used to control the opening and closing of the sod gate 90.

Although an open chain link conveyor belt is shown other types of conveyor belts may be used without departing from the spirit and scope of the invention. While the invention has been described with respect to handling and transporting spoiled sod rolls within and through the frame of the sod harvester the invention may also be used to remove spoiled or unusable flat sod slabs within and through the frame of the sod harvester. As described herein the invention allows an operator to determine where and when the scrap sod should be discharged from the scrap sod carrier.

Figure 16:
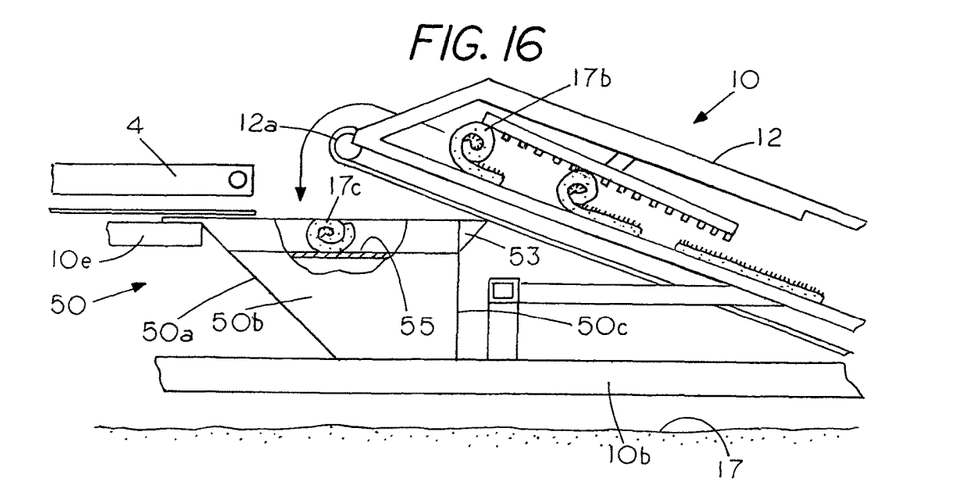
FIG. 16 is an isolated view of the sod harvester conveyor with the scrap sod carrier comprising a gravity chute as the sod conveyor carrier delivers a spoiled sod roll to the scrap sod carrier.

FIG. 16 is an isolated view of the sod harvester 10 showing an example of a scrap sod carrier 50 having a gravity chute 55 for transferring a scrap sod slab from one side of the harvester to the opposite side of the harvester as opposed to the scrap sod carrier 20 having a conveyor belt to transfer a scrap sod slab from one side of the harvester to the opposite side of the harvester. A top or input end of the gravity chute 55 is located beneath a fall line extending from the discharge end 12a of the sod conveyor 12 in order to receive a spoiled sod slab dropped from the sod conveyor 12. FIG. 10 shows the sod conveyor 12 delivering a spoiled sod roll 17c to the open top end of gravity chute 55, which is supported by sod harvester frame members 10b and 10e. In this example the spoiled sod roll 17c falls onto the gravity chute 55, which comprise a smooth floor that angles downward from the discharge end 12a of the conveyor that is located on one side of the sod harvester 10 to the discharge end of the gravity chute 55, which is located on the opposite side of the sod harvester 10. A feature of the gravity chute 55 is that the smooth and angled gravity chute 55 forms a slide that allows spoiled sod roll 17c to slide from the top end of the gravity chute 55 to the lower end of the gravity chute 55 in response to the gravitational force acting on the spoiled sod roll 17c and without use of external power.

Figure 17:
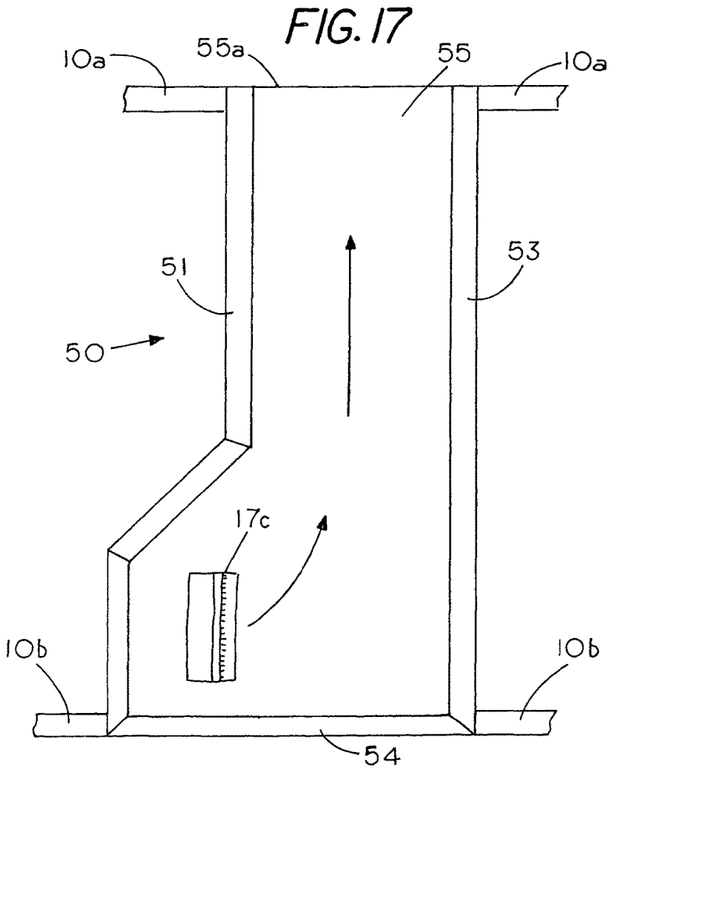
FIG. 17 is an isolated top view of the scrap sod carrier of FIG. 16.

FIG. 17 is a top isolated view of the scrap sod carrier 50 revealing the angled sidewalls 51, 54 and 53 that are joined to gravity chute 55 to form a trough for funneling spoiled sod roil 17c to a discharge end 55a of the gravity chute 55. Typically, gravity chute 55 may be a flat floor of sheet metal or the like, which provides low frictional sliding resistance to the spoiled sod roll 17c that falls thereon. The arrows indicate the sliding path of spoiled sod roll 17c as it slides from the higher elevation proximate one side of the sod harvester 10 to the lower elevation proximate the opposite side of the sod harvester 10. In this example the spoiled sod roll 17c slides along gravity chute 55 from the right side of the sod harvester 10b to the opposite side 10a of the sod harvester 10 and is subsequently discharged from end 55a of the gravity chute 55. A feature of the gravity chute 55 is that the chute can transfer the spoiled sod roll 17c from side to side of the sod harvester 10 all within the internal framework of sod harvester and without power to a position where the spoiled sod 17c can be discharged onto the sod field 12 where the spoiled sod 17c does not interfere with subsequent sod harvesting passes of the sod harvester. Thus one can transfer spoiled sod rolls 17c from side to side of the sod harvester 10 with either the scrap sod carrier that uses a conveyor belt or the scrap sod carrier that uses a gravity chute.

Figure 18:
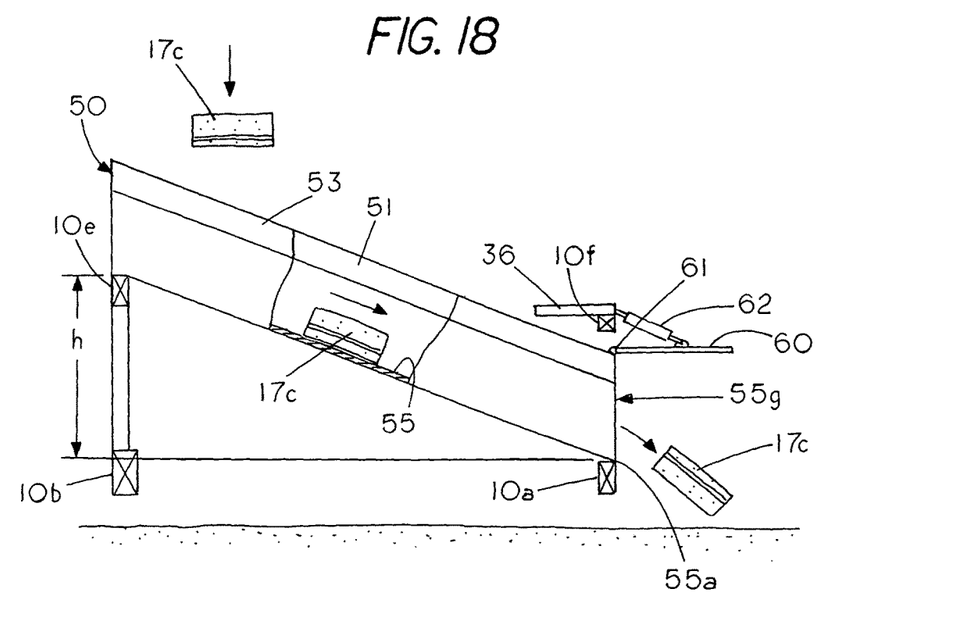
FIG. 18 is an isolated and partial sectional front view of the scrap sod carrier of FIG. 16.

FIG. 18 is an isolated and partial sectional front view of the scrap sod carrier 50, which is supported on one end by sod harvester frame 10b and the other end by sod harvester frame 10a. The difference in elevation between the discharge end 55a of the scrap sod carrier 50 and the upper input end of the scrap sod carrier 50 is indicated by "h" with the elevation difference from end to end such that gravity causes a spoiled sod roll 17c thereon to slide along chute 55 to the discharge end 55a of scrap sod carrier 50 where it is dropped on field 12.

While scrap sod carrier 50 may be used without a sod gate as illustrate in FIG. 11 one may want to use scrap sod carrier 50 with a sod gate 60, as illustrated in FIG. 12. In the embodiment of FIG. 12 the sod gate 60, which is shown in the open condition, allows spoiled sod roll 17c to slide out the end 55a of the gravity chute 55. A feature of the use of the sod gate 60 is that when the sod gate 60 is pivoted to the closed or vertical condition i.e. where the sod gate 60 extends across the open-end 55g the sod gate 60 prevents spoiled sod rolls 17c from being discharged from the gravity chute 55. This feature allows one to accumulate and hold spoiled sod rolls 17c in front of sod gate 60. One can then discharge the spoiled sod rolls 17c, which have accumulated in front of the sod gate 60, from the end of the chute 55 by pivoting the sod gate 60 about hinge 61 through a hydraulic cylinder 62, which may be manually controlled by the operator of the sod harvester. The spoiled sod rolls 17c can then be dumped in a pile for later removal.

I claim:

1. A sod harvester comprising:
a sod cutter for cutting a sod slab from a sod field;
a sod slab conveyor having a ground end and a top end for elevating the cut sod slab from a ground level to the top end of the sod slab conveyor; and
an articulated conveyor having a fixed end and a free end positionable proximate the top end of the sod slab conveyor with the free end movable between an inline position for receiving and carrying away an unspoiled sod slab from the top end of the sod slab conveyor and an offline position for dumping a spoiled sod slab from the top end of the sod slab conveyor.

2. The sod harvester of claim 1 where a sod transfer speed of the articulated conveyor is synchronized with a transfer speed of the sod slab conveyor to transfer the unspoiled sod slab from the sod slab conveyor to the articulated conveyor in a continuous motion and without spoiling a sod slab thereon.

3. The sod harvester of claim 1 where the free end of the articulated conveyor is pivotal mounted with respect to the fixed end of the articulated conveyor with the free end pivotal from the inline position for inline sod transfer between the sod slab conveyor and the free end of the articulated conveyor to an offline condition that allows a spoiled sod slab to fall off the top end of the sod slab conveyer without engaging the free end of the articulated conveyor.

4. The sod harvester of claim 3 wherein the top end of the sod slab conveyor and an end of the free end of the articulated conveyor are located proximate to each other in the inline position for on-the-go transfer of an unspoiled sod slab from the sod slab conveyor to the free end of the articulated conveyor.

5. The sod harvester of claim 4 including an alignment arm on the free end of the articulated conveyor and a stop on sod slab conveyor for engaging the alignment arm on the free end of the articulated conveyor to bring the sod slab conveyor and the free end of the articulated conveyor into the inline position.

6. The sod harvester of claim 5 including a common sprocket shaft on the fixed end of the articulated conveyor and the free end of the articulated conveyor to maintain a same sod transfer rate on the fixed end of the articulated conveyor and the free end of the articulated conveyor as the free end of the articulated conveyor is moved from the offline position to the inline position or vice versa.

7. The sod harvester of claim 6 including a set of two-way hydraulic cylinders for pivoting the free end of the articulated conveyor from the offline position to the inline position and vice versa.

8. The sod harvester of claim 7 wherein a set of conveyor chain belts on the free end of the articulated conveyor and a set of conveyor chain belts on the fixed end of the articulated conveyor are linked to each other through a set of sprockets affixed to a common shaft with the free end of the articulated conveyor pivotal about the common shaft.

9. The sod harvester of claim 1 including a scrap sod carrier extended transversely to the sod harvester for capturing and directing a spoiled sod slab laterally away from the sod harvester.

10. A sod harvester including:
a first sod conveyor for removing a spoiled sod slab or an unspoiled sod slab from a sod field;
a second sod conveyor pivotal from an inline condition to an offline condition for dumping the spoiled sod slab; and
a transversely extending scrap sod carrier for receiving the spoiled sod slab from the sod conveyor when the sod conveyor is in the offline condition.

11. The sod harvester of claim 10 wherein the second sod conveyor includes a chain link conveyor belt.

12. The sod harvest or claim 10 including a hydraulic cylinder for pivoting the second sod conveyor from the inline condition to the offline condition and vice versa.

13. The sod harvester of claim 10 including a hydraulic motor for driving the second sod conveyor.

14. The sod harvester of claim 10 wherein the second sod conveyor comprise a first conveyor section and a second conveyor section with a common shaft for pivoting the first conveyor section of the second sod conveyor with respect to the second conveyor section of the second sod conveyor.

15. The sod harvester of claim 14 wherein the common shaft includes a set of sprocket wheels engaged to a first set of chains on a fixed end of the second sod conveyor and a second set of sprocket wheels engaged to a set of chains on a free end of the second sod conveyer so that rotation of the first set of chains rotates the common shaft and the second set of chains.

16. The sod harvester of claim 10 wherein the scrap sod carrier includes a sod gate.

17. A method of on-the-go isolation of scrap sod during sod harvesting comprising the steps of:
cutting and elevating a plurality of sod slabs from a sod field with a first sod conveyor;
periodically dropping a spoiled sod slab from the first sod conveyor by pivoting a second sod conveyor to an offline condition while continuing to transport an unspoiled sod slab on the second sod conveyor.

18. The method of claim 17 including pivoting the second sod conveyor from an inline condition to an offline condition through a set of hydraulic cylinders and dropping the spoiled sod slab into a scrap sod carrier.

19. The method of claim 18 including the step of aligning the second sod conveyor with the first sod conveyer through engagement of an arm on the second sod conveyor and a stop on the first sod conveyor as the second sod conveyor is pivoted from an offline condition to an inline condition.

20. The method of claim 19 including the step of simultaneously powering both the first sod conveyor and the second sod conveyor as the second sod conveyor cycles between either an inline condition or an offline condition.

* * * * *